United States Patent [19]

Taylor

[11] Patent Number: 4,819,919
[45] Date of Patent: Apr. 11, 1989

[54] BOOT SEAL FOR LIQUID SPRING USED IN CORROSIVE ENVIRONMENTS

[75] Inventor: Douglas P. Taylor, Tonawanda, N.Y.

[73] Assignee: Tayco Developments, Inc., North Tonawanda, N.Y.

[21] Appl. No.: 719,424

[22] Filed: Apr. 3, 1985

Related U.S. Application Data

[63] Continuation of Ser. No. 558,856, Dec. 7, 1983, abandoned.

[51] Int. Cl.$^4$ .................................................. F16F 9/38
[52] U.S. Cl. .................................. 267/64.13; 74/18.2; 92/168; 188/321.11; 188/322.16; 188/322.17; 277/212 FB; 403/51; 411/539
[58] Field of Search .................. 188/322.11, 322.16, 188/322.17, 322.19, 321.11, 322.21; 267/64.27, 64.13, 122, 141.1, 141.5, 64.28, 35; 277/212 FB, 237 A, DIG. 4, DIG. 6, 180; 92/168, 168 B, 34, 40-44; 91/369 A, 369 B; 74/18, 18.1, 18.2; 403/50, 51, 134, 223, 227, 408; 411/40, 353, 539, 531, 517, 518; 280/672, 702, 693

[56] References Cited

U.S. PATENT DOCUMENTS

| | | | |
|---|---|---|---|
| 311,178 | 1/1885 | Duffy | 74/18.2 X |
| 2,226,388 | 12/1940 | Richter | 74/18.1 X |
| 2,565,841 | 8/1951 | Conforto | 74/18.2 X |
| 2,731,797 | 1/1956 | Ayers | 92/42 X |
| 2,778,629 | 1/1957 | Johnson | 267/152 |
| 3,101,131 | 8/1963 | De Carbon et al. | 267/64.13 X |
| 3,126,744 | 3/1964 | Hermanns | 267/121 X |
| 3,153,541 | 10/1964 | Rudder | 277/180 |
| 3,286,577 | 11/1966 | Weidner | 277/180 X |
| 3,305,228 | 2/1967 | Steck et al. | 267/152 X |
| 3,638,503 | 2/1972 | Stipanovic et al. | 74/18.2 X |
| 3,897,070 | 7/1975 | Anderson et al. | 277/212 FB X |
| 4,232,496 | 11/1980 | Warkentin | 277/180 X |
| 4,306,708 | 12/1981 | Gassaway et al. | 267/141.3 |

FOREIGN PATENT DOCUMENTS

| | | | |
|---|---|---|---|
| 723028 | 7/1942 | Fed. Rep. of Germany | 411/539 |
| 849343 | 11/1939 | France | 277/180 |
| 103972 | 8/1979 | Japan | 188/322.21 |

Primary Examiner—Douglas C. Butler
Attorney, Agent, or Firm—Joseph P. Gastel

[57] ABSTRACT

A boot seal in the form of a bellows for a shock absorber in the form of a liquid spring mounted in a sleeve having a sleeve flanged secured to a deck by bolts, the boot seal including a collapsible central bellows portion, an upper cylindrical boot portion attached to the liquid spring casing by means of a hose clamp, a lower annular resilient boot flange extending substantially perpendicularly to the longitudinal axis of the boot and having a plurality of first scalloped cutouts in its outer periphery, an annular trim ring overlying the annular boot flange and having second scalloped cutouts in its outer periphery overlying the first scalloped cutouts of the boot flange, retention and spacer washers having lower washer portions extending through the aligned first and second scalloped cutouts and having upper washer flange portions bearing on the trim ring, the lower washer portions being of a length which is less than the combined thickness of the trim ring and the annular boot flange so that when the bolts pass through the retention and spacer washers and are tightened into the deck the lower washer portions will bear on the sleeve flange to maintain a rigid connection between the sleeve flange and the deck and the annular boot flange will be compressed the correct amount to provide a good seal.

24 Claims, 3 Drawing Sheets

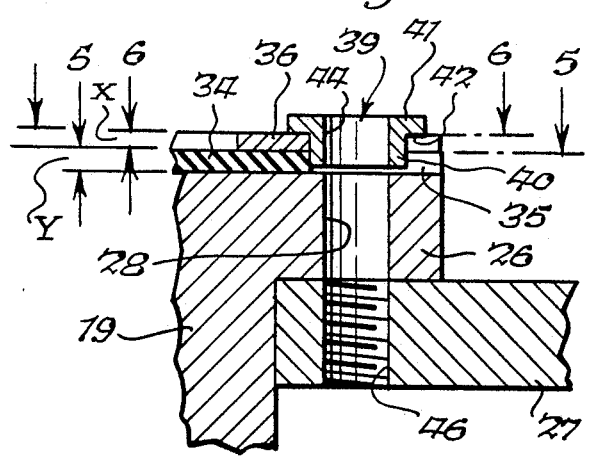
Fig. 3.
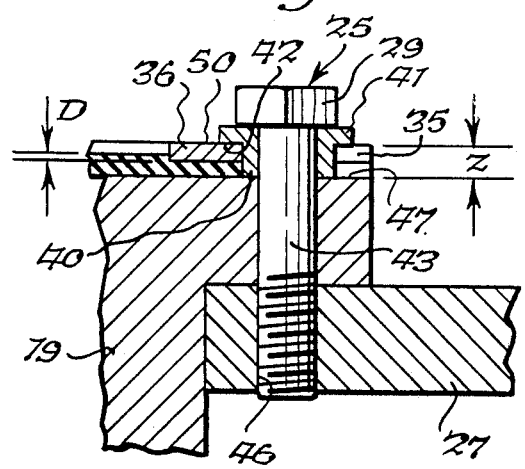
Fig. 4.
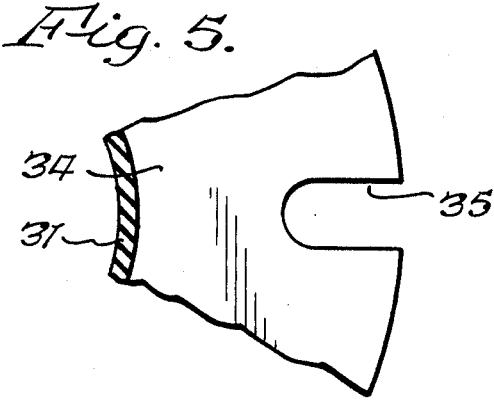
Fig. 5.
Fig. 6.
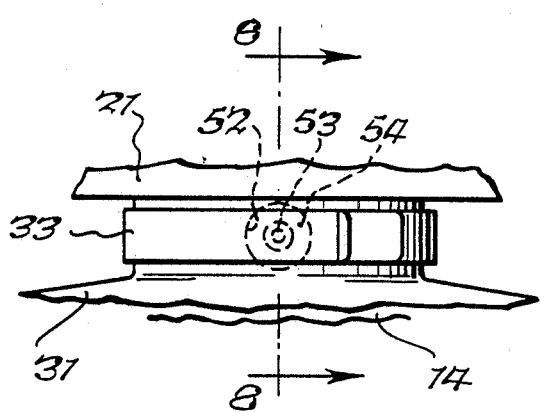
Fig. 7.
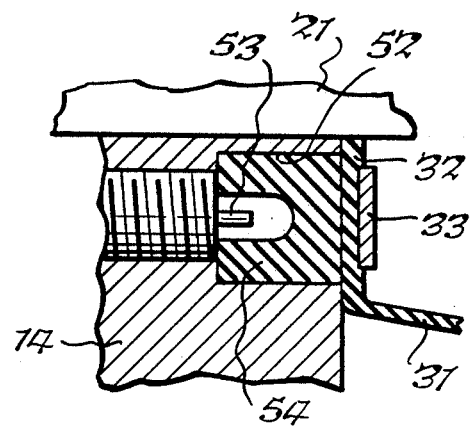
Fig. 8.

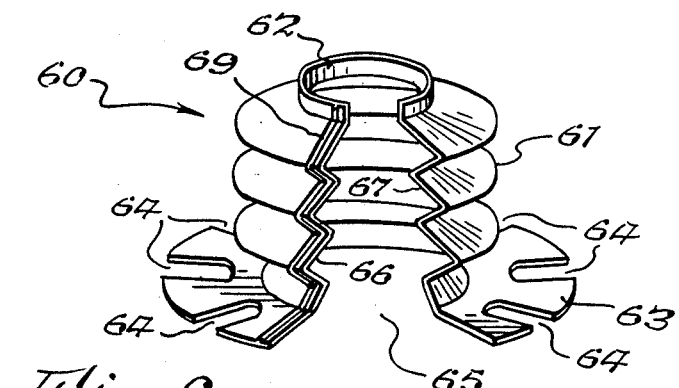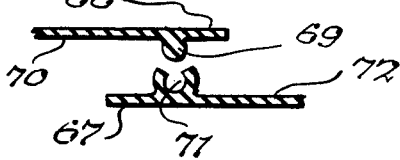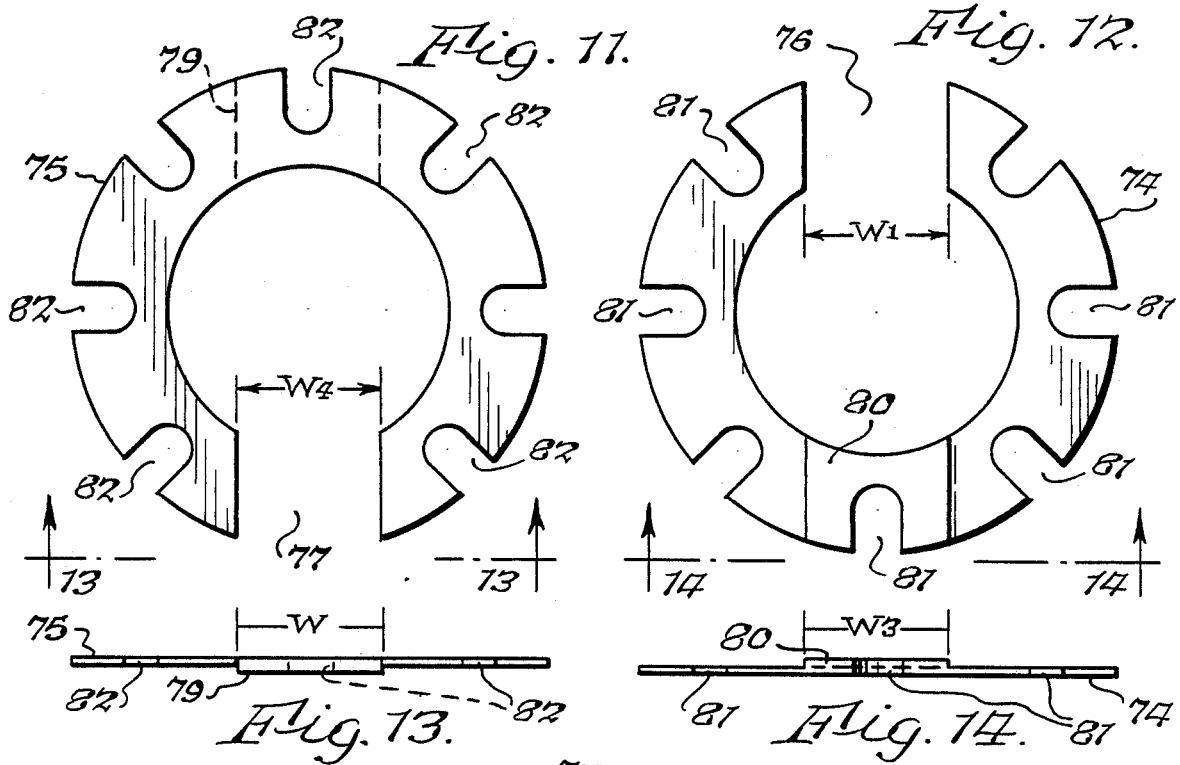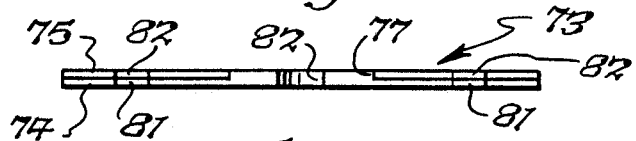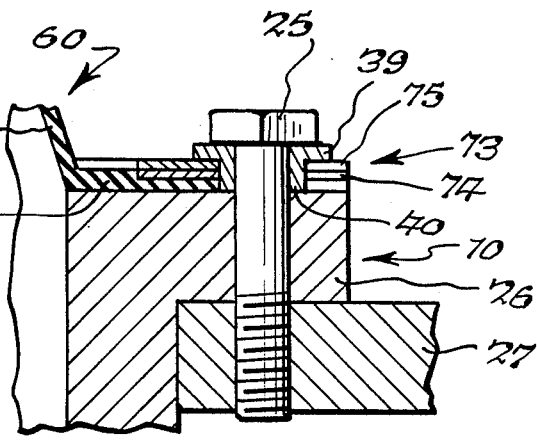

BOOT SEAL FOR LIQUID SPRING USED IN CORROSIVE ENVIRONMENTS

This is a continuation of application Ser. No. 558,856 filed Dec. 7, 1983, now abandoned.

BACKGROUND OF THE INVENTION

The present invention relates to a boot seal construction for a shock absorber construction which is exposed to a corrosive environment.

By way of background, there is in use a shock absorber construction which includes a liquid spring assembly which is mounted on the deck of a ship and which supports an object such as a gun turret. The liquid spring in the past has been exposed to salt air and sea water which corroded the piston and casing of the liquid spring and thereby impaired its ability to function in the desired manner. In the past, to overcome the problem, a drainage hole was supplied in the sleeve which mounted the liquid spring to prevent accumulation of salt water therein. While this alleviated the problem to some extent, it did not solve it completely because the parts of the liquid spring were still exposed to sea water and salt air.

SUMMARY OF THE INVENTION

It is accordingly one important object of the present invention to provide a boot seal for a shock absorber construction used in corrosive environments, such as a sea environment, to thereby prevent both corrosive gases, such as salt-laden air, and corrosive liquids, such as sea water, from contacting the exposed parts of the shock absorber construction.

Another object of the present invention is to provide a boot seal for a shock absorber construction which can be mounted on a preexisting structure without in any way requiring modification of the latter.

A further object of the present invention is to provide a boot seal for a shock absorber construction which can be mounted on a preexisting structure without requiring the detachment of the shock absorber from the structure which it supports. Other objects and attendant advantages of the present invention will readily be perceived hereafter.

The present invention relates to an improvement in a shock absorber construction mounted on a deck including a shock absorber having a casing, a sleeve mounting said casing for reciprocatory motion therein, a sleeve flange on said sleeve, a sleeve end portion on said sleeve remote from said sleeve flange, a piston in said casing in effective abutting relationship with said sleeve end portion, a casing end portion on said casing remote from said sleeve end portion located proximate said sleeve flange, attachment means on said casing end portion for attachment to a member which is to be supported by said shock absorber, and a plurality of bolts having bolt heads for effectively bearing on said sleeve flange and extending through said sleeve flange and received in said deck for securing said sleeve flange to said deck, the improvement comprising an annular contractible boot having a longitudinal axis and first and second boot ends, a boot portion on said first boot end in contiguous abutting relationship with said casing proximate said attachment means, securing means for securing said boot portion on said first boot end to said casing in sealing relationship, an annular resilient boot flange on said boot at said second boot end, said annular boot flange having a first thickness and extending substantially perpendicularly to said longitudinal axis of said boot for placement in contiguous abutting relationship with said sleeve flange, annular trim ring means having a second thickness and interposed between said bolt heads and said annular boot flange, and retention and spacer washer means interposed between each of said bolt heads and said sleeve flange, each of said retention and spacer washer means having a first washer portion and a second washer portion, said first washer portion being of an axial length which is shorter than the sum of said second thickness and said first thickness when the latter is uncompressed, said second washer portion comprising a washer flange extending outwardly from said first washer portion, said bolt heads bearing on said second washer portions, whereby the tightening of said bolts simultaneously secures said sleeve flange to said deck and causes said washer flanges to compress said annular resilient boot flange an amount which is equal to the difference in thickness between said axial lengths of said first washer portions and the sum of the thicknesses of said trim ring and the uncompressed thickness of said annular resilient boot flange to thereby provide a good seal with said sleeve flange. The various aspects of the present invention will be more fully understood when the following portions of the specification are read in conjunction with the accompanying drawings wherein:

BRIEF DESCRIPTION OF THE DRAWINGS

FIG. 3 is an enlarged fragmentary cross sectional view taken substantially along line 3—3 of FIG. 2 and showing the relative positions of the various parts which receive the mounting bolts before the latter are inserted to compress the resilient boot flange;

FIG. 4 is a view similar to FIG. 3 but showing the positions assumed by the parts after a bolt has been tightened to hold the parts in their final assembled positions with the outer edge of the resilient boot flange compressed to form a seal;

FIG. 5 is a fragmentary view of the boot flange taken substantially along line 5—5 of FIG. 3;

FIG. 6 is a fragmentary view of the trim ring taken substantially along line 6—6 of FIG. 3;

FIG. 7 is a fragmentary side elevational view taken substantially in the direction of arrows 7—7 of FIG. 2 and showing the relationship between the upper portion of the boot, and the plugged bore in the shock absorber casing;

FIG. 8 is a fragmentary cross sectional view taken substantially along line 8—8 of FIG. 7;

FIG. 9 is a perspective view of a bellows which is opened longitudinally so that it can be installed about an existing casing without detaching the casing from the structure which it supports;

FIG. 10 is a fragmentary cross sectional view showing a type of locking construction which can be used to close the bellows after it surrounds the casing;

FIG. 11 is a plan view of the upper half of a split trim ring which can be installed about the casing;

FIG. 12 is a plan view of the lower half of a split trim ring which can be installed about the casing;

FIG. 13 is a side elevational view taken substantially in the direction of arrows 13—13 of FIG. 11;

FIG. 14 is a side elevational view taken substantially in the direction of arrows 14—14 of FIG. 12;

FIG. 15 is a side elevational view of the upper and lower split ring halves assembled with each other; and FIG. 16 is a fragmentary cross sectional view similar to FIG. 4 and showing the positions assumed by the various parts after a bolt has been tightened to hold the parts in their final assembled positions with the outer edge of the resilient boot flange compressed to form a seal.

DESCRIPTION OF THE PREFERRED EMBODIMENTS

Figure 2:
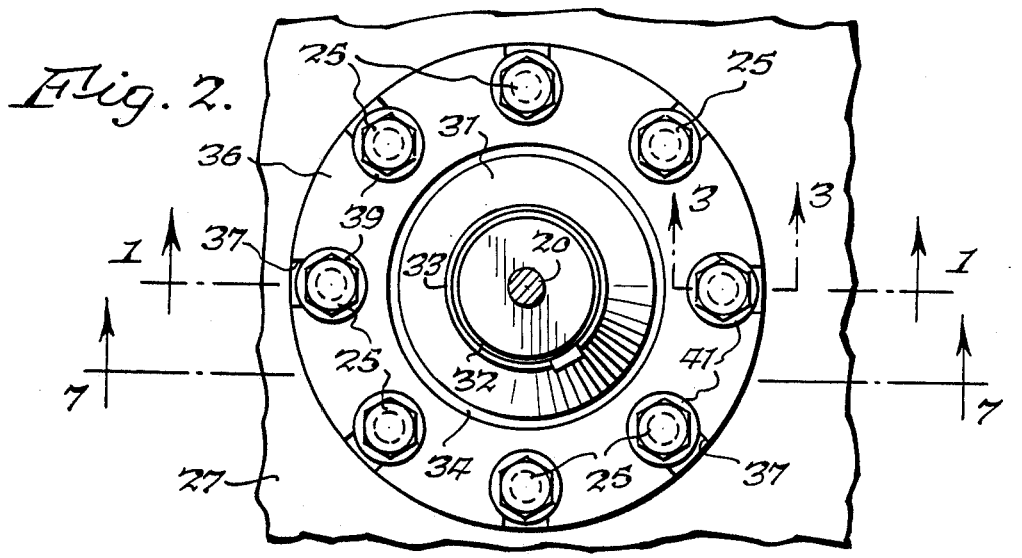
FIG. 2 is a fragmentary cross sectional view taken substantially along line 2—2 of FIG. 1.
Figure 1:
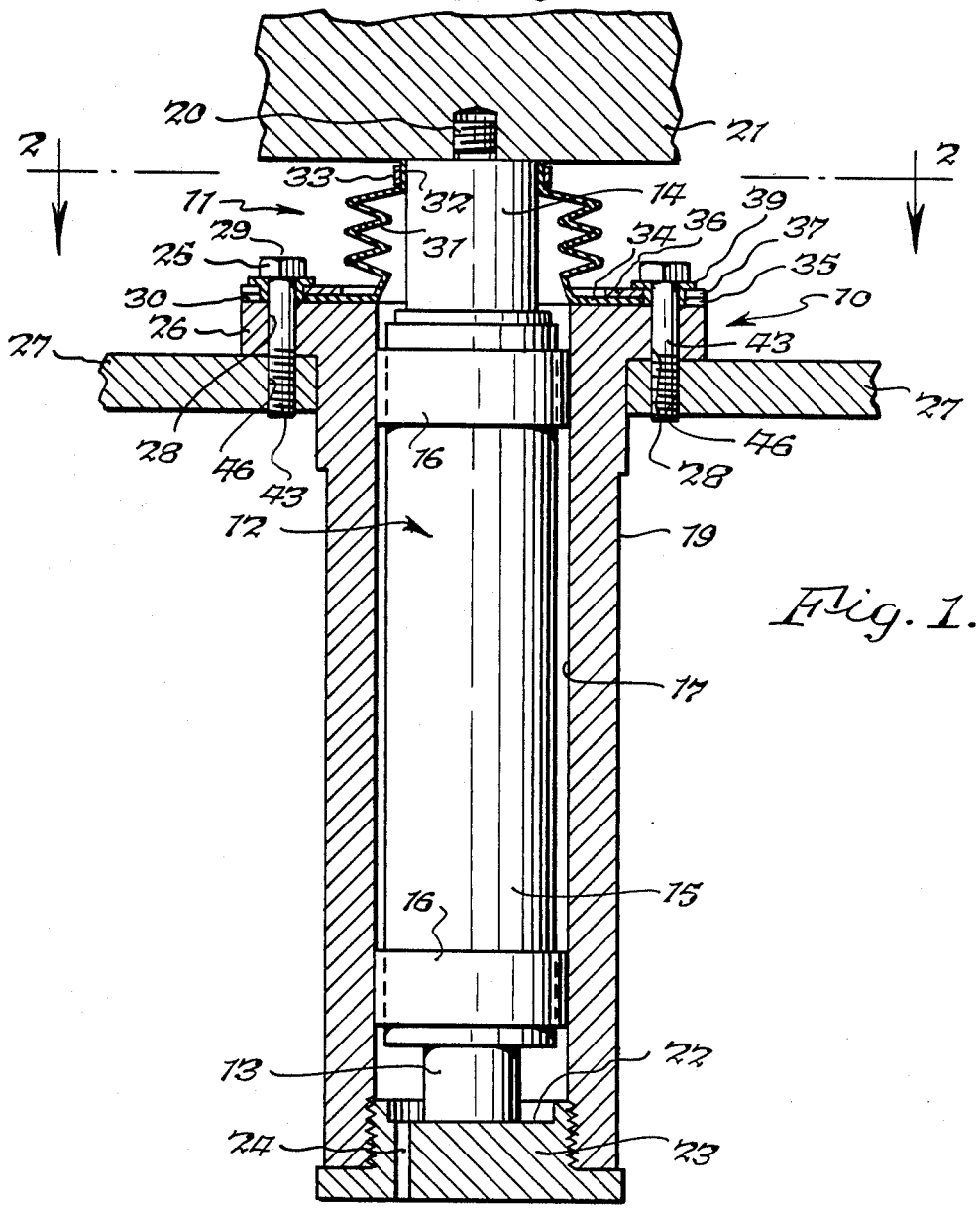
FIG. 1 is a fragmentary cross sectional view taken substantially along line 1—1 of FIG. 2 and showing the boot seal structure of the present invention mounted relative to the casing of a shock absorber and also showing the various other structure associated with the shock absorber.

In FIGS. 1 and 2 a prior art shock absorber system is shown to which has been added the boot seal 11 of the present invention. The prior art shock absorber system 10 includes a casing 12 which receives a piston 13. Casing 12 and piston 13 constitute a conventional liquid spring wherein a compressible liquid, such as silicone liquid, is confined, and this compressible liquid is compressed when piston 13 is forced into casing 12. Casing 12 includes a smaller diameter upper portion 14 and a larger diameter lower portion 15. Annular bushings 16 are located on the outside of lower casing portion 15 and space the latter from inner cylindrical wall 17 of mounting sleeve 19. The upper end of casing portion 14 includes an integral screw-threaded protuberance 20 which is threadably received in member 21 which is isolated by the shock absorber 12. The piston 13 bears against surface 22 of plug 23 which is threadably received in sleeve 19. A drain hole 24 is provided in cap 23. A plurality of bolts 25 extend through holes 28 in sleeve flange 26 of sleeve 19 to secure the latter to a ship deck 27, or the like. Whenever a downward force is applied to member 21, casing 12 will be moved downwardly, as guided by bushings 16, and thus piston 13 will be forced into casing 12. When the force is removed, the compressible liquid in casing 12 will expand to cause member 21 to return to its original position.

Prior to the instant invention, the heads 29 of bolts 25 bore directly on the upper surface 30 of sleeve flange 26 to hold sleeve 19 in position. There was no seal 11 in the combination. The assembly 10 was used on board a sea-going vessel wherein the parts were subjected to salt air. Therefore, any salt air to which the outer surface of casing 12 was exposed, upon condensation, ran down the outer surface of casing 12 and the inner surface 17 of sleeve 19 and drained through drain hole 24. The outside of casing 12 and piston 13 were also subjected to liquid salt water which washed over deck 27 and ran into the space between the outer surface of casing 12 and inner cylindrical surface 17. Because piston 13 and casing portion 15 were exposed to the salt from the air and the water, their outer surfaces became corroded, and this impaired the ability of piston 13 to slide into and out of casing 12 without sticking and also impaired the ability of casing portion 15 to slide in bushings 16.

The boot construction 11 of the present invention, which is in the form of a bellows, effectively seals the outside of casing 12 and the inside surface 17 of sleeve 19 from salt air and salt water without in any way changing any of the parameters of the prior art shock absorber system 10. The boot seal construction includes an annular accordian-pleated bellows portion 31 fabricated of a suitable flexible resilient sheet rubber compound. At its upper end the accordian-pleated annular bellows portion 31 terminates at a cylindrical portion 32 which is secured to upper casing portion 13 by a hose clamp 33, thereby providing a seal against entry of moisture or liquid of any kind between boot portion 32 and upper casing portion 14. The lower end of bellows 31 terminates at annular boot flange 34 having a plurality of scalloped openings 35 therein equally spaced about its entire periphery. An annular trim ring 36, having a plurality of circumferentially spaced peripheral scallop-like openings 37, is located in overlying relationship to boot flange 34 with openings 37 registering with openings 35. A retention washer 39 includes an elongated lower cylindrical annular body portion 40 and an upper annular flange 41, and the lower surface 42 of annular flange 41 bears on trim ring 36. The shank 43 of each bolt 25 extends through the central bore 44 of each washer 39 and is threadably received in tapped bore 46 of deck 27.

The thickness of trim ring 36 is X (FIG. 3) and the thickness of uncompressed boot flange 34 is Y. The length of body portion 40 of retention washer 39 is Z (FIG. 4). When each bolt 25 is threaded to its final position, the lower annular edge 46 of each retention washer 39 will bear against the upper surface 47 of annular flange 26 of sleeve 19, and the underside 42 of each washer flange 41 will bear against the upper surface 50 of trim ring 36. Since the length Z of washer portion 40 is less than the sum of the thickness X of trim ring 36 and the uncompressed thickness Y of boot flange 34, when each retention washer 39 is forced to move from the position of FIG. 3 to the position of FIG. 4, by the tightening of each bolt 25, boot flange 34 will be compressed by an amount which is equal to the sum of X plus Y minus the dimension Z, or an amount designated on FIG. 4 by the numeral D. The existence of the metal trim ring 36 about the entire periphery of boot flange 34 will cause the entire peripheral portion of the boot flange 34 to be compressed equally throughout by the amount D to thereby provide a good seal with the upper surface 30 of sleeve flange 26. By way of example, boot flange 34 can be approximately 0.125 inches thick and it can be compressed about 10% when bolts 25 are tightened.

The use of the retention washers 39 in the above described manner produces a two-fold result. First of all, as noted above, it causes the outer edge of boot flange 34 to be compressed just the right amount to provide good sealing while preventing the metal trim ring 36 from being moved an excessive amount whereby it cuts the boot flange. Secondly, the same screws 25, which are used for normally securing flange 26 to deck 27, are still used for the same purpose. Thus, the improved boot construction 10 of the present invention constitutes an add-on to the above described prior shock absorber structure without requiring any modification whatsoever of the latter.

The upper portion 14 of cylinder 12 includes a bore 52 (FIGS. 7 and 8) which houses a charging plug 53 through which cylinder 12 may be charged with compressible liquid. In order to insure the fluid-tightness of boot portion 32 with cylinder portion 14, a plastic cap plug 54 is inserted into bore 52 with an interference fit so that a good seal will be provided between boot portion 32 and plug 54. The plug 54 is necessary because the diameter of bore 52 is greater than the width of hose clamp 33, and if plug 54 was not used, there could be leakage in the area where hose clamp 33 overlies bore 52.

In FIGS. 9–16 another embodiment of the present invention is disclosed which can be installed on an existing shock absorber construction which is in operating position mounting another body, such as member 21. In this respect, it will be appreciated that the boot seal construction 11 of FIG. 1 has to be installed before member 21 is secured to casing 14. However, the embodiment of FIGS. 9–16 can be installed on an existing shock absorber installation wherein member 21 is already mounted on shock absorber casing 14 by means of screw-threaded protuberance 20.

The bellows 60 includes a central accordian-pleated portion 61, a cylindrical upper portion 62 and an annular boot flange 63 having scalloped openings 64 circumferentially spaced thereon throughout its extent. Boot 60 is open or split at 65, that is, its periphery is not continuous. Therefore, referring to FIG. 1, it can be installed about casing upper portion 14 by causing the opening 65 to pass around the casing. The edges 66 and 67 of the bellows 60 have a fastener construction therein which consists of a bead 69 on the outer surface 70 of edge portion 66 and a bead-receiving opening 71 on the inner surface 72 of edge portion 67. The bead 69 fits snugly within opening 71, and thus after the bellows 60 is in position about upper casing portion 14, bead 69 is inserted into opening 71 to seal the bellows and thus make its entire circumference continuous from portion 62 out to the end of annular boot flange 63. While one form of fastener device has been shown, it will be appreciated that other forms, such as individual snaps or other types of fasteners, may be used, or, if desired, the overlapping end portions 66 and 67 may be adhesively secured to each other. The upper annular portion 62 of the boot is secured to shock absorber upper casing portion 14 by means of a hose clamp, such as 33, as described in detail above.

In the embodiment of FIGS. 9–16, a trim ring assembly 73 consisting of lower split ring half 74 and upper split ring half 75 are used. Split ring halves 74 and 75 are metal members which have openings 76 and 77, respectively, at portions of their periphery. Upper split ring 75 has a rib 79 extending downwardly therefrom which is diametrically opposite to opening 77. Rib 79 has a width W which is equal to the width W1 of opening 76 of lower ring 74. Lower ring 74 includes a rib 80 which is diametrically opposite to opening 76 and has a width W3 which is equal to the width W4 of opening 77 of upper ring half 75. Upper ring portion 75 has scalloped openings 82 therein and lower ring portion 74 has scalloped openings 81 therein.

Ring portions 74 and 75 are placed in position above annular boot flange 63 by moving each of the ring halves 74 and 75 radially relative to boot 61 until it is centrally located therein. More specifically, lower trim ring half 74 is passed radially relative to the boot with rib 80 facing upwardly. Opening 76 will pass around bellows 61. Thereafter, upper trim ring half 75 is moved radially relative to the boot 60 so that the latter will pass through opening 77. Rib 79 will be facing downwardly. The upper and lower trim rings 75 and 74, respectively, are circumferentially adjusted relative to each other until rib 79 is received in opening 76 and rib 80 is received in opening 77. The amount that ribs 79 and 80 project above the surface of each of rings 74 and 75 is equal to the thickness of the portion of the other trim ring half which does not include the rib. Therefore, when trim ring halves 74 and 75 are assembled, as shown in FIG. 15, the assembly will have a uniform thickness throughout its extent. At this time scalloped peripheral openings 80 and 81 will be in alignment with each other.

Thereafter, the assembled trim ring halves 74 and 75 are moved circumferentially until the aligned scallops 80 and 81 are in alignment with scalloped openings 64 of annular boot flange 63. A retention washer 39, which has been described in detail above relative to FIGS. 1–8, is then inserted through each set of aligned scalloped openings 81, 82 and 64, as shown in FIG. 16, and a bolt, such as 25, is threaded downwardly into deck 27. The parameters of the structure shown in FIG. 16 are essentially the same as described above relative to FIGS. 3 and 4 except that the total thickness of the trim ring halves 74 and 75 at all points throughout its circumference is the same as the thickness of trim ring 36. Furthermore, as explained above relative to FIGS. 1–8, the thickness of the combined trim ring halves 74 and 75 and the thickness of the uncompressed boot flange 63 is greater than the length of the body portion 40 of retention washer 39 so that when bolts 25 are tightened down, the annular boot flange 63 will be compressed an amount which is the difference of the uncompressed thickness of the boot flange plus the combined thickness of the trim ring portions 74 and 75 minus the length of retention washer body portion 40, to thereby provide a good seal.

It will be appreciated, as set forth above, that the advantage of the structure of FIGS. 9–16 over that of FIGS. 1–8 is that the boot seal construction can be installed on an existing assembled structure, such as shown in FIG. 1, without requiring detachment of member 21 from shock absorber casing upper portion 14.

While the seals have been shown in the form of accordian-pleated annular bellows, it will be appreciated that they are essentially a boot which can take other forms.

It can thus be seen that the boot seals of the present invention are manifestly capable of achieving the above enumerated objects, and while preferred embodiments of the present invention have been disclosed, it will be appreciated that it is not limited thereto, but may be otherwise embodied within the scope of the following claims.

What is claimed is:

1. In a shock absorber construction mounted on a deck including a shock absorber having a casing, a sleeve mounting said casing for reciprocatory motion therein, a sleeve flange on said sleeve, a sleeve end portion on said sleeve remote from said sleeve flange, a piston in said casing in effective abutting relationship with said sleeve end portion, a casing end portion on said casing remote from said sleeve end portion located proximate said sleeve flange, attachment means on said casing and portion for attachment to a member which is to be supported by said shock absorber, and a plurality of bolts having bolt heads for effectively bearing on said sleeve flange and extending through said sleeve flange and received in said deck for securing said sleeve flange to said deck, the improvement comprising an annular contractible boot having a longitudinal axis and first and second boot ends, a boot portion on said first boot end in contiguous abutting relationship with said casing proximate said attachment means, securing means for securing said boot portion on said first boot end to said casing in sealing relationship, an annular resilient boot flange on said boot at said second boot end, said annular boot flange having a first thickness and extending substantially perpendicularly to said longitudinal axis of said boot for placement in contiguous abutting relationship with said sleeve flange, annular trim ring means having a second thickness and interposed between said bolt heads and said annular boot flange, and retention and spacer washer means interposed between each of said bolt heads and said sleeve flange, each of said retention and spacer washer means having a first washer portion and a second washer portion, said first washer portion being of an axial length which is shorter than the sum of said second thickness and said first thickness when the latter is uncompressed, said second washer portion comprising a washer flange extending outwardly from said first washer portion, said bolt heads bearing on said second washer portions, whereby the tightening of said bolts simultaneously secures said sleeve flange to said deck and causes said washer flanges to compress said annular resilient boot flange an amount which is equal to the difference in thickness between said axial lengths of said first washer portions and the sum of the thicknesses of said trim ring and the uncompressed thickness of said annular resilient boot flange to thereby provide a good seal with said sleeve flange.

2. In a shock absorber construction mounted on a deck as set forth in claim 1 wherein said annular boot flange includes a plurality of first cutouts, and wherein said trim ring includes a plurality of second cutouts in alignment with said first cutouts, said first washer portions being located in said first and second cutouts, and said axial bolts extending through said spacer washers.

3. In a shock absorber construction mounted on a deck as set forth in claim 1 wherein said securing means comprises a hose clamp.

4. In a shock absorber construction mounted on a deck as set forth in claim 3 wherein said casing includes a radial bore underlying said first boot end, said radial bore being of greater diameter than the width of said hose clamp, and a sealing plug in said radial bore for effectively closing said radial bore to prevent leakage therethrough into said boot.

5. In a shock absorber construction mounted on a deck as set forth in claim 1 wherein said boot portion on said first end is cylindrical, and wherein said casing end portion of said casing is cylindrical.

6. In a shock absorber construction mounted on a deck as set forth in claim 1 wherein said annular boot flange has a longitudinal opening therein with edge portions adjacent said opening, and means for securing said edge portions to each other to close said opening.

7. In a shock absorber construction mounted on a deck as set forth in claim 1 wherein said annular trim ring means comprises first and second substantially annular members each having an opening and a rib which is the thickness of the other annular member so that the rib of each annular member fits into the opening of the other annular member.

8. In a shock absorber construction mounted on a deck as set forth in claim 7 wherein said annular boot flange has a longitudinal opening therein with edge portions adjacent said opening, and means for securing said edge portions to each other to close said opening.

9. In a shock absorber construction mounted on a deck as set forth in claim 6 wherein said annular boot flange includes a plurality of first cutouts, and wherein said trim ring means include a plurality of second cutouts in alignment with said first cutouts, said first washer portions being located in said first and second cutouts, and said axial bolts extending through said spacer washers.

10. In a shock absorber construction mounted on a deck as set forth in claim 9 wherein said securing means comprises a hose clamp.

11. In a shock absorber construction having a housing mounted on a base by means of a housing flange, a reciprocable member movable relative to said housing, and a plurality of bolts having bolt heads for effectively bearing on said housing flange and received in said base for securing said housing flange to said base, the improvement comprising an annular contractible boot having a longitudinal axis and first and second boot ends, a boot portion at said first boot end, securing means for securing said boot portion at said first boot end to said reciprocable member for reciprocation therewith, a compressible boot flange on said boot at said second boot end, said compressible boot flange extending substantially perpendicularly to said longitudinal axis of said boot for placement in effective abutting relationship with said housing flange, said compressible boot flange having a first thickness when said compressible boot flange is uncompressed, trim means for bearing on said boot flange, said trim means having a second thickness and interposed between said bolt heads and said compressible boot flange, and spacer washer means effectively interposed between each of said bolt heads and said housing flange, each of said spacer washer means being of an axial length which is less than the sum of said second thickness and said first thickness, said bolt heads effectively bearing on said spacer washer means, whereby the tightening of said bolts simultaneously secures said housing flange to said base and causes said trim means to compress said compressible boot flange an amount which is equal to the difference in thickness between said axial length of said spacer washer means and the sum of the thicknesses of said trim means and the uncompressed thickness of said compressible boot flange to thereby provide a good seal with said housing flange.

12. In a shock absorber construction as set forth in claim 11 wherein said housing flange and said boot flange are of annular shape.

13. In a shock absorber construction as set forth in claim 12 wherein said housing flange has first openings therein for receiving said bolts, and wherein said trim means and said boot flange has second openings therein in registry with said openings in said housing flange.

14. In a shock absorber construction as set forth in claim 13 wherein said second openings are in the form of scallops.

15. In a shock absorber construction as set forth in claim 13 including retention means between said spacer washer means and said bolt heads for bearing on said trim means.

16. In a shock absorber construction as set forth in claim 15 wherein said washer means and said retention means are integral.

17. In a shock absorber construction as set forth in claim 12 wherein said boot portion at said first boot end comprises a second flange extending in the direction of said longitudinal axis, and wherein said securing means comprises a hose clamp.

18. A boot seal as set forth in claim 12 wherein said trim means comprise first and second substantially annular members each having an opening and a rib which is the thickness of the other annular member so that the rib of each annular member fits into the opening of the other annular member when said first and second annular members are in superimposed relationship.

19. In a shock absorber construction as set forth in claim 18 wherein said boot seal has a longitudinal opening therein with edge portions adjacent said opening, and means for securing said edge portions to each other to close said opening.

20. In a shock absorber construction as set forth in claim 19 wherein said housing flange has first openings therein for receiving said bolts, and wherein said trim means and said boot flanges have second openings therein in registry with said openings in said housing flange.

21. In a shock absorber construction as set forth in claim 20 wherein said second openings are in the form of scallops.

22. A boot seal for mounting between a first member and second member comprising a first member, a second member which is movable relative to said first member, a boot seal having a central body portion and first and second end portions at opposite ends of said central body portion, first securing means for securing said first end portion to said second member, a compressible boot flange on said boot seal at said second end portion, said compressible boot flange having an uncompressed first thickness, trim means for bearing on said boot flange, said trim means having a second thickness, a plurality of bolt means, heads on said bolt means, and spacer washer means having a length which is less than the sum of said first and second thicknesses for effective placement between said bolt head and said first member on which said compressible boot flange is to be mounted whereby when said bolt means are tightened into said first member said bolt heads will effectively bear on said trim means and said spacer washer means will limit the distance between said bolt heads and said first member to thereby limit the amount which said compressible boot flange can be compressed to provide a good seal, said boot flange being of annular shape, said boot seal having a longitudinal axis and said boot flange extending substantially perpendicularly to said longitudinal axis, said boot flange having a plurality of first openings to receive said spacer washer means, said trim means having a plurality of second openings to receive said spacer washer means, and said trim means comprising first and second substantially annular members each having an opening and a rib which is the thickness of the other annular member so that the rib of each annular member fits into the opening of the other annular member.

23. A boot seal as set forth in claim 22 wherein said boot seal has a longitudinal opening therein with edge portions adjacent said opening, and means for securing said edge portions to each other to close said opening.

24. A boot seal as set forth in claim 22 including second flange means at said first boot end, said second flange means extending in the direction of said longitudinal axis, and hose clamp means extending around said second flange means for securing said second flange means to said second member in sealing relationship.

* * * * *